Figure 1:
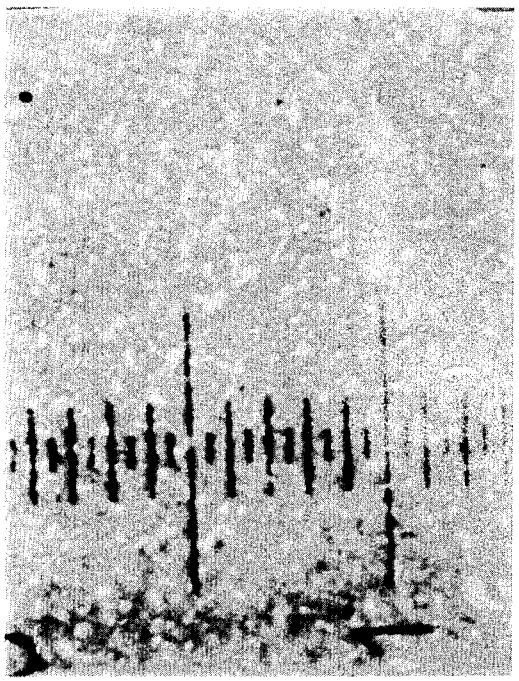

United States Patent [19]  [11] 3,890,250
Richerson  [45] June 17, 1975

[54] HOT PRESSED SILICON NITRIDE CONTAINING FINELY DISPERSED SILICON CARBIDE OR SILICON ALUMINUM OXYNITRIDE

[75] Inventor: David W. Richerson, Auburn, Mass.
[73] Assignee: Norton Company, Worcester, Mass.
[22] Filed: Aug. 27, 1973
[21] Appl. No.: 392,094

Related U.S. Application Data

[63] Continuation-in-part of Ser. No. 340,948, March 14, 1973, abandoned.

[52] U.S. Cl. ............... 252/516; 106/44; 252/500; 252/518
[51] Int. Cl. ............................................. H01b 1/04
[58] Field of Search ...... 252/500, 518, 516; 106/44; 423/344, 345, 406, 439, 625, 327

[56] References Cited
UNITED STATES PATENTS

| | | | |
|---|---|---|---|
| 2,750,268 | 6/1956 | Erasmus et al. | 106/44 X |
| 2,968,530 | 1/1961 | Forgeng et al. | 106/44 |
| 3,211,527 | 10/1965 | Forsyth | 423/344 |
| 3,356,513 | 12/1967 | Washburn | 423/385 |
| 3,468,992 | 9/1969 | Lubatti et al. | 106/44 X |

FOREIGN PATENTS OR APPLICATIONS

| | | | |
|---|---|---|---|
| 1,476,381 | 2/1967 | France | 106/44 |

Primary Examiner—Benjamin R. Padgett
Assistant Examiner—R. E. Schafer
Attorney, Agent, or Firm—Oliver W. Hayes

[57] ABSTRACT

A hot-pressed silicon nitride product containing a finely dispersed silicon carbide mixture is described. The product has very high strength at room temperature as well as high strength at elevated temperature. It has a high density and its electrical conductivity can be controlled over several orders of magnitude. In preferred forms the electrical resistivity is on the order of 2–10 ohm centimeters and, accordingly, the product can be machined by electric discharge machining. Where high strength is desired the product can be made to have a transverse rupture strength in excess of 100,000 p.s.i. as measured by a four point test at room temperature and, at 1375°C, the transverse rupture strength can be in excess of 40,000 p.s.i., as measured by a three point test. This high strength product is formed predominantly of an essentially continuous matrix of silicon nitride which, under a scanning electron microscope, appears to have an average crystal size less than 1 micron.

Particles of very fine silicon carbide also form a continuous electrical path due to points of contact between individual particles. The silicon carbide particles are preferably all less than about 3 microns in diameter with the average diameter of the silicon carbide particles being less than about 1 micron.

In other forms of the invention some or all of the silicon nitride can be replaced by silicon aluminum oxynitride having the beta silicon nitride structure.

13 Claims, 4 Drawing Figures

1000X   2.85µ/DIV.

1000X   2.85µ/DIV.

1000X   2.85µ/DIV.

2000X

HOT PRESSED SILICON NITRIDE CONTAINING FINELY DISPERSED SILICON CARBIDE OR SILICON ALUMINUM OXYNITRIDE

This application is in part a continuation of my copending application Ser. No. 340,948 filed Mar. 14, 1973 now abandoned.

BACKGROUND OF THE INVENTION

The present invention is directed, in a preferred form, to high strength silicon nitride products which have a controlled low electrical resistivity along with their high strength. An improved hot-pressed silicon nitride is described in copending application Ser. No. 318,474 filed Dec. 26, 1972, in the names of Richerson and Washburn, that application being assigned to Norton Company, assignee of the present application. The present invention goes beyond the results achieved by the teachings of the above-identified Richerson and Washburn application in several important respects. In the first place the product has an enormously lower resistivity than the hot-pressed silicon nitride of Richerson and Washburn. Secondly, the transverse rupture strength of the product of the present invention, as measured on the four point test, can be made consistently over 100,000 p.s.i.

THE PRIOR ART

The old U.S. Pat. No. 866,444 to Egly shows the reaction sintering of silicon in the presence of silicon carbide to form a mixture of silicon carbide and silicon nitride having relatively low resistivity. Such a product does not provide the kind of high room temperature strength achievable by hot pressing. Similarly U.S. Pat. No. 3,394,026 refers to the use of 5–10 percent by weight of fine silicon carbide for improving the creep strength of reaction sintered silicon nitride. This product has the same defects as the old Egly patent. A recent report by Westinghouse on contract 100014-68-C-0323 mentions the addition of silicon carbide, as fine as 5 microns, to improve the transverse rupture strength of hot-pressed silicon nitride. While some improvement is obtained the test results reported by Westinghouse did not come up to the transverse rupture strengths achieved in the present invention.

With respect to the Westinghouse work there is no evidence that they measured resistivity and it would appear that, in view of the large particle size, the smallest being 5 microns, the electrical resistivity of the resultant product (even with relatively high concentrations of silicon carbide) would be quite high. This is due to the isolation of the individual silicon carbide by the silicon nitride product. Another, but less pertinent reference, is the U.S. Pat. No. 3,468,992 to Lubetti et al. which involves mixing and compacting equal parts of SiC and $Si_3N_4$ with an added 4% of $B_2O_3$. This mixture is fired in air to give a very hard product whose other properties are unknown.

Some recently published work by Avco in connection with NASA contract NAS 3-14333 discusses the addition of fine silicon carbide whiskers to $Si_3N_4$ before hot pressing to improve the mechanical behavior of the resultant compacts. The Avco workers concluded that this approach was unpromising.

Several additional patents, No. 3,305,372 to Taylor and No. 3,291,623 to Saunders et al., are pertinent in connection with those embodiments of the invention wherein the product contains silicon carbide and silicon aluminum oxynitride. These two patents show reactions which result in the formation of a mixture of silicon carbide and silicon nitride either with the production of, or in the presence of, alumina and it is conceivable that some silicon aluminum oxynitride may have been produced during the nitriding operations described in these patents. However neither of these patents describes products having the electrical and physical properties of the products of the present invention.

THE PRESENT INVENTION

For many applications of hot-pressed silicon nitride it is highly desireable to provide controlled electrical conductivity without sacrificing transverse rupture strength either at room temperature or at high temperature. In achieving these desired objectives controlled amounts of very finely divided silicon carbide are added to very finely divided alpha silicon nitride powder. The materials are intimately mixed and hot-pressed, preferably with a sintering aid, to provide intertwined matrices of silicon nitride and silicon carbide. Where high electrical conductivity (low resistivity) is desired it is preferred that sufficient silicon carbide be present, and that it be sufficiently well dispersed throughout the silicon nitride powder, so that there is a continuous electrical path through the silicon carbide from one adjacent silicon carbide particle to the next. This is necessary since silicon nitride has a resistivity greater than $1 \times 10^{10}$ ohm centimeters or higher, depending upon its purity.

Figure 2:
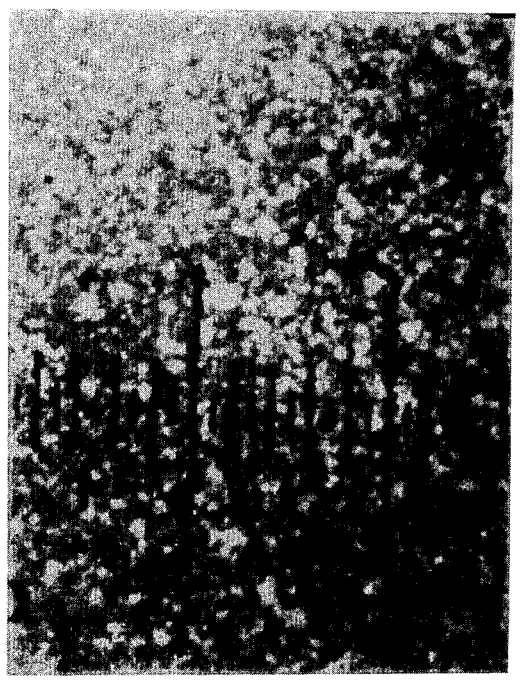
Figure 3:
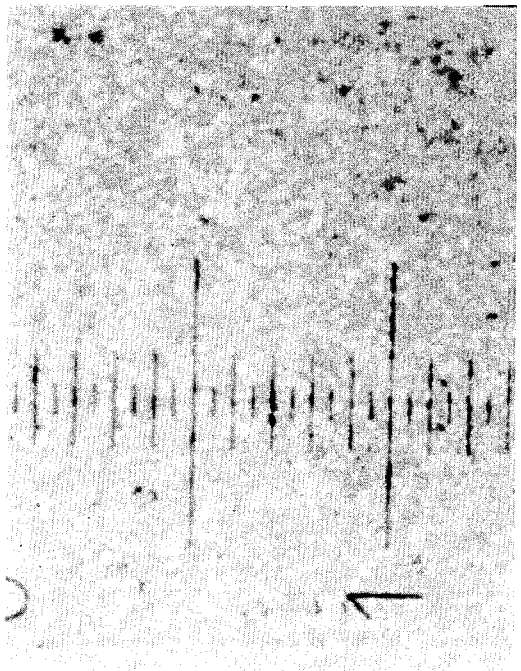

FIGS. 1–3 show respectively the microstructure of the 90-10, 75-25, and 65-35 compositions (being various mixtures of $Si_3N_4$ and SiC having the indicated weight ratios of $Si_3N_4$ to SiC). These micrographs were made at 1000× magnification in reflected light. Each micrograph contains a scale whose smallest division is 2.85 microns. The silicon nitride appears gray and the silicon carbide appears white in the micrographs.

Figure 4:
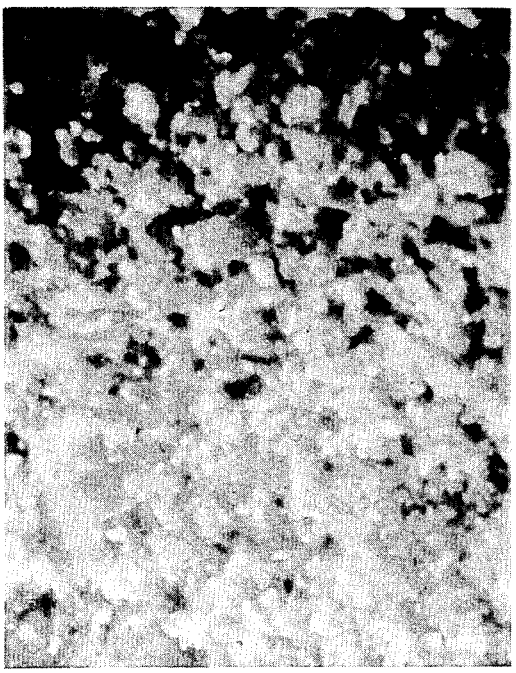

The largest SiC particles are 3–5 microns and the average size is 1 micron or less. Since the samples are not etched, it is not possible to tell if the SiC particles are single crystals or polycrystalline. Individual $Si_3N_4$ particles cannot be distinguished. FIG. 4 is a scanning electron micrograph of a fracture surface of the 65-35 composition at 2000× magnification. $Si_3N_4$ cannot be distinguished visually from SiC, but the average grain size is obviously under 1 micron.

A comparison of FIGS. 1–3 is most valuable in explaining the electrical properties of the compositions. In FIG. 1, the $Si_3N_4$ matrix predominates with each SiC particle being completely surrounded by insulative $Si_3N_4$. A conductive path does not exist, so that the resistivity should be high. In FIG. 2 the $Si_3N_4$ matrix predominates, but the SiC particles are much closer together with many actually in contact. The probability of a limited number of conductive paths is much higher and the resistivity of the bulk material should be lower. In FIG. 3, the $Si_3N_4$ still appears to be the matrix phase, but the SiC also appears to be a continuous interconnected phase. Conductive paths should be common, resulting in a low resistivity.

Table I summarizes the electrical and mechanical properties of a range of compositions from pure silicon nitride to 60% $Si_3N_4$ - 40% SiC. The measured resistivities compare very well with results predicted from examination of the microstructure.

To determine the types of electrical response possible for the more conductive composites, samples ⅛ × ¼ × 2 inches were connected into a circuit and current (I), time, and temperature measured for a constant AC voltage (E). The resistance (R) and resistivity ($\rho$) were then calculated respectively by $R = E/I$ and $\rho = AR/l$ where $l$ = guage length of sample and $A$ = cross sectional area of sample. The results are listed in Table II.

EXAMPLE I

The samples listed in Tables I and II were prepared from starting powders having the following characteristics:

These powders were mixed in the desired compositions and 3% of the $Si_3N_4$ weight of $MgCO_3$ added as a sintering acid. The mixtures were then ball milled in a slurry of isopropanol for approximately 17 hours in a tungsten carbide lined ball mill using tungsten carbide grinding media thus reducing the powders to the desired small size. Samples were then hotpressed under a pressure of 2000 p.s.i. at 1730°C to 1775°C (higher temperature required for higher SiC contents) for 60 minutes.

TABLE I

MECHANICAL AND ELECTRICAL PROPERTIES OF $Si_3N_4$-SiC COMPOSITIONS

| Sample | Composition $Si_3N_4$/SiC | Density q/cm³ | MOR* at 20°C psi | MOR** at 1375°C psi | Resistivity ohm - cm |
|---|---|---|---|---|---|
| Typical $Si_3N_4$ | 100/0 | 3.25 | 104,000 | 53,000 | >10¹⁰ |
| G-2(FIG. 1) | 90/10 | 3.27 | 80,200 | — | >10⁶ |
| H-1 | 85/15 | 3.33 | 105,300 | — | 50,000 |
| I-1 | 82.5/17.5 | 3.32 | 115,200 | — | 720 |
| D-2 | 80/20 | 3.05 | 121,800*** | 58,700 | 136 |
| J-1 | 77.5/22.5 | 3.31 | 97,400 | — | 35 |
| K-1(FIG. 2) | 75/25 | 3.30 | 125,100 | 46,600 | 13 |
| L-1 | 72.5/27.5 | 3.34 | 103,400 | 52,000 | 8.2 |
| E-2 | 70/30 | 3.18 | 105,400*** | 46,700 | 4.5 |
| M-1 | 67.5/32.5 | 3.30 | 108,800 | — | 3.3 |
| N-2(FIG. 3) | 65/35 | 3.39 | 120,700 | 46,000 | 2.0 |
| F-2 | 60/40 | 3.03 | 106,500*** | 46,800 | 1.9 |

*4-point flexure test with outer span of 1.5 inch and inner span of ¾ inch.
**3-point flexure test with 1 inch span.
***3-point flexure test with ¾ inch span.

| | $Si_3N_4$ | SiC |
|---|---|---|
| Average size | −100 mesh | 3 – 5 microns |
| Phases | 92% $\alpha$ $Si_3N_4$ | 6H$\alpha$SiC |
| | <8% $\beta$ $Si_3N_4$ | |
| | <1% $Si_2ON_2$ | |
| Impurities (Wt. %) | | |
| Mg | .01 – .1 | — |
| Ca | .02 – .1 | — |
| Fe | .2 – .4 | .1 – .3 |
| Al | .1 – .3 | .1 – .3 |

The electrical properties of the products prepared in accordance with Example I were compared with several other products made in a similar fashion. The results of tests on these materials are listed in Table II.

The range of products having between 20 and 40 percent by weight of silicon carbide have very interesting electrical characteristics. Samples E and F listed in the

TABLE II

HEATING RESPONSE OF $Si_3N_4$-SiC COMPOSITES

| Sample | Composition ($Si_3N_4$-SiC) | Temp (°C) | Time (min) | Current (amps) | AC Voltage (volts) | Calc. Resistance (ohms) | Calc. Resistivity (ohm-cm) |
|---|---|---|---|---|---|---|---|
| A | 80–20 | Under 200 | No change in 4 min. | <0.1 | 45 | — | — |
| B | 70–30 | R.T. | 0 | 0.1 | 45 | 450 | 17.8 |
| | | 375 | 3 | 0.2 | 45 | 225 | 8.9 |
| | | 600 | 7 | 0.3 | 45 | 150 | 5.9 |
| C | 60–40 | R.T. | 0 | 1.0 | 45 | 450 | 17.8 |
| | | 600 | 0.75 | 1.6 | 45 | 196 | 7.8 |
| | | 850 | 3 | 3.1 | 45 | 145 | 5.7 |
| A | 80–20 | R.T. | 0 | — | 120 | — | — |
| | | 600 | 1.5 | 0.4 | 120 | 300 | 11.9 |
| | | 750 | 5 | 0.6 | 120 | 200 | 7.9 |
| B | 70–30 | 200 | 0.15 | 1 | 120 | 120 | 4.7 |
| | | 600 | 0.35 | 2 | 120 | 60 | 2.4 |
| | | 1200 | 1 | 3 | 120 | 40 | 1.6 |
| C | 60–40 | R.T. | 0 | 2.4 | 80 | 33 | 1.3 |
| | | 600 | 0.15 | 2.7 | 80 | 30 | 1.2 |
| | | 1200 | 0.5 | 5 | 80 | 16 | 0.7 |
| | | >1300 | 1 | 5.8 | 80 | 14 | 0.5 |
| E | 70–30 | R.T. | 0 | 0.3 | 80 | 266 | 10.5 |
| | | 600 | 1.75 | 1 | 80 | 80 | 3.2 |
| | | >700 | 3 | 1.1 | 80 | 73 | 2.9 |
| F | 60–40 | R.T. | 0 | 1.5 | 80 | 53 | 2.1 |
| | | 200 | 0.1 | 2 | 80 | 40 | 1.6 |
| | | 600 | 0.3 | 4 | 80 | 20 | 0.8 |
| | | 1400 | 0.7 | 7 | 80 | 11 | 0.5 | above tables were tested for electrical discharge machining (EDM), using a 12 amp capacity Elox apparatus, the EDM machining rate was 0.010 – 0.02 inch per minute.

From the above test results it is apparent that the electrical properties of the silicon nitride-silicon carbide composites, particularly those containing 30 to 40 percent silicon carbide are such that the material will heat up when an electrical current is passed therethrough. The final temperature achieved, the rate of heat up and the necessary amperage are all controllable by the composition of the composite. Thus a whole series of high strength, oxidation resistant, electrical devices can be manufactured with precise control over their electrical properties. This provides a wide range of materials suitable for heating elements or suitable for the manufacture of complex shapes where EDM machining is the only feasible method of low cost production.

In still other forms of the invention the silicon nitride in the hot-pressed product can be replaced either wholly or partially by silicon aluminum oxynitride. For purposes of this patent application "silicon aluminum oxynitride" is intended to include materials which contain silicon aluminum oxygen and nitrogen either as: (a) a solid solution of alumina or aluminum in silicon nitride or silicon oxynitride or (b) as a substitution compound wherein aluminum and/or oxygen have replaced silicon and/or nitrogen in the basic silicon nitride crystal structure.

The silicon aluminum oxynitride structure is very similar to the beta silicon nitride structure although its lattice parameters are slightly expanded, the degree of expansion depending upon the percent of aluminum in the structure. There are several ways of making silicon aluminum oxynitride. One is that described by Jack and Wilson in *Nature Physical Science*, Vol. 238, July 10, 1972 pages 28 and 29. In the Jack and Wilson procedure alumina is reacted with silicon nitride to form the silicon aluminum oxynitride. Jack and Wilson postulate a formula of $Si_{6-.75x}Al_{.67x}N_{8-x}O_x$. Another method of making silicon aluminum oxynitride involves the reaction of aluminum with silicon oxynitride to form a compound which is postulated to have the formula $Si_{2-x}Al_xON_2$. This compound and its method of preparation is described in the copending application of Weaver, Ser. No. 246,818 filed Apr. 24, 1972, and assigned to Norton Company, assignee of the present application. The disclosure of the Weaver application is incorporated herein by reference.

The product containing the silicon aluminum oxynitride is preferred in those cases where the optimum oxidation resistance along with high temperature strength is required. The silicon aluminum oxynitride-silicon carbide mixture also has the advantage that it can be produced by sintering without the necessity of hot pressing although work to date does not indicate that the ultimate room temperature strength can be achieved by mere sintering. One preferred method of forming the product containing the silicon aluminum oxynitride (using the Jack and Wilson procedure) is shown in the following example.

EXAMPLE II 105 grams of silicon nitride of the type used in Example I were mixed with 105 grams of GS5 alumina along the 90 grams of fine silicon carbide having the properties of the SiC of Example I. The GS5 alumina is a high purity alumina having a five micron particle size.

The above components were mixed with 400 ml. isopropyl alcohol and milled for 20 hours in a 0.3 gallon tungsten carbide lined ball mill with tungsten carbide balls. The resulting slurry was screened through a 325 mesh screen and dried. 150 grams of dried powder were loaded into a 3 inch diameter graphite mold and hot-pressed at 1750°C under 3000 p.s.i. for 30 minutes. The resulting sample had a bulk density of 3.11 grams per cubic centimeter.

A portion of the sample was crushed and analyzed by X-ray diffraction. Only the beta silicon nitride structure and silicon carbide phases were present, the silicon nitride peaks being shifted to slightly larger D spacings as described in the work by Jack and Wilson. This is believed to indicate that all of the alumina was present in the beta silicon nitride structure as part of that structure.

Samples ⅛ × ¼ × 2–3 inches were prepared by diamond cutting and grinding for property measurements. The material had an electrical resistivity of approximately 7 ohm centimeters and an average modulus of rupture, as measured on a three point test, at room temperature of 70,800 p.s.i. The resistivity of this product is similar to a comparable product having a 70/30 silicon nitride to silicon carbide ratio listed in Table I above. While high temperature modulus of rupture tests were not made on these Example II samples it is believed that they would equal or exceed the test data listed in Table I.

It appears that silicon aluminum oxynitride can be used throughout the whole range of product compositions described above for silicon nitride. In general the silicon nitride will be stronger, particularly at room temperature, than the silicon aluminum oxynitride. However the latter may have advantages with respect to high temperature strength and oxidation resistance. In general the silicon aluminum oxynitride will have outstanding thermal shock resistance and low thermal expansion. Also it may have advantages in certain cases where sintering of preformed bodies is necessary because hot pressing is difficult or impossible to use.

When extremely low resistivity is required, such as resistivity of less than 1 ohm centimeter, the amount of silicon carbide is increased above 50%, and may be as high as 60%. Thus by using the procedures of Example I but increasing the weight percent of silicon carbide to 50% of the product a resistivity of 0.9 ohm centimeters is obtained. However in this case the room temperature modulus of rupture (3 point test) is dropped to 83,400 p.s.i. When the silicon carbide is increased to 60% of the product the resistivity drops to 0.15 ohm centimeters and the modulus of rupture, under the three point test, at room temperature is down to 25,900 p.s.i. However where a minimum resistance is necessary this strength may be more than adequate.

What is claimed is:

1. Monolithic, high density silicon nitride product whose silicon nitride is predominantly beta phase, the product containing between 10 and 50 percent silicon carbide, the product having interengaged matrices of silicon nitride and silicon carbide, the product being characterized by a modulus of rupture, in excess of 100,000 p.s.i. at 20°C as measured by four point flexure testing, and in excess of 40,000 p.s.i. at 1375°C as measured by three point testing, the product having an electrical resistivity between 1 and 1×10⁷ ohm centimeters.

2. Monolithic, high density silicon nitride product whose silicon nitride is predominantly beta phase, the product containing between 20 and 50 percent silicon carbide, the product, when examined by an optical microscope at 1000× magnification demonstrating a substantially continuous silicon nitride matrix and an interengaged silicon carbide matrix forming a substantially continuous electrical path between adjacent silicon carbide particles, the product being characterized by a modulus of rupture, in excess of 100,000 p.s.i. at 20°C as measured by four point testing, and in excess of 40,000 p.s.i. at 1375°C as measured by three point testing, the product having an electrical resistivity between 1 and 1×10³ ohm centimeters.

3. Monolithic, high density silicon nitride product whose silicon nitride is predominantly beta phase, the product containing between 20 and 50 percent silicon carbide, the product, when examined by an optical microscope at 1000× magnification demonstrating a substantially continuous silicon nitride matrix and an interengaged silicon carbide matrix forming a substantially continuous electrical path between adjacent silicon carbide particles, essentially all of the silicon carbide particles have a diameter less than about 3 microns and an average diameter less than 1 micron, the product being characterized by a modulus of rupture, in excess of 100,000 p.s.i. at 20°C as measured by four point testing, and in excess of 40,000 p.s.i. at 1375°C, the product having an electrical resistivity between 1 and 1×10² ohm centimeters.

4. Monolithic, high density silicon nitride product whose silicon nitride is predominantly beta phase, the product containing between 20 and 50 percent silicon carbide, the product having interengaged matrices of silicon nitride and silicon carbide, the product being characterized by a modulus of rupture, in excess of 100,000 p.s.i. at 20°C as measured by four point testing and in excess of 40,000 p.s.i. at 1375°C as measured by three point testing, the product having a resistivity which ranges between 1 and 150 ohm centimeters at room temperature and 0.3 to 50 ohm centimeters at 1000°C.

5. The product of claim 1 containing between about 30 and about 40 weight percent silicon carbide.

6. The product of claim 1 having a resistivity of less than 10 ohm centimeters at room temperature.

7. The product of claim 1 wherein the silicon nitride matrix has a grain size of less than 3 microns.

8. The product of claim 1 containing a small amount of a complex metal silicate formed as a result of the use of a sintering aid in the hot pressing operation.

9. Monolithic, high density product comprising a mixture of silicon carbide and at least one compound containing silicon and nitrogen and having the beta silicon nitride structure, said compound being selected from the group consisting of beta silicon nitride and silicon aluminum oxynitride having an expanded beta silicon nitride structure, the product containing between 10 and 50 percent silicon carbide, the product having interengaged matrices of silicon carbide and said compound the product being characterized by a modulus of rupture in excess of 70,000 p.s.i. at 20°C as measured by three point flexure testing, the silicon carbide particles having an average size of 1 micron or less as indicated on photomicrograph at 1000× magnification, the product having an electrical resistivity between 1 and 1×10⁷ ohm centimeters.

10. Monolithic, high density silicon nitride product whose silicon nitride is predominantly beta phase, the product containing between 50 and 60 percent silicon carbide, the product, when examined by an optical microscope at 1000× magnification demonstrating a substantially continuous silicon nitride matrix and an interengaged silicon carbide matrix forming a substantially continuous electrical path between adjacent silicon carbide particles, the product being characterized by a modulus of rupture, in excess of 25,000 p.s.i. at 20°C as measured by three point testing, the product having an electrical resistivity of between 0.1 and 1.0 ohm centimeters.

11. Monolithic, high density product containing silicon aluminum oxynitride having an expanded beta silicon nitride structure, the product containing between 20 and 50 percent silicon carbide, the product, when examined by an optical microscope at 1000× magnification demonstrating a substantially continuous silicon aluminum oxynitride matrix and an interengaged silicon carbide matrix forming a substantially continuous electrical path between adjacent silicon carbide particles, essentially all of the silicon carbide particles have a diameter less than about 3 microns and an average diameter less than 1 micron, the product being characterized by a modulus of rupture, in excess of 70,000 p.s.i. at 20°C as measured by three point testing, the product having an electrical resistivity between 1 and 1×10² ohm centimeters.

12. Monolithic, high density product containing silicon aluminum oxynitride having an expanded beta phase silicon nitride structure, the product containing between 50 and 60 percent silicon carbide, the product, when examined by an optical microscope at 1000× magnification demonstrating a substantially continuous silicon aluminum oxynitride matrix and an interengaged silicon carbide matrix forming a substantially continuous electrical path between adjacent silicon carbide particles, essentially all of the silicon carbide particles have a diameter less than about 3 microns and an average diameter less than 1 micron, the product being characterized by a modulus of rupture, in excess of 25,000 p.s.i. at 20°C as measured by four point testing, the product having an electrical resistivity of less than 1 ohm centimeters.

13. The product of claim 9 wherein contains both silicon nitride and silicon aluminum oxynitride.

* * * * *